US006993680B2

(12) United States Patent
Fukumori

(10) Patent No.: US 6,993,680 B2
(45) Date of Patent: Jan. 31, 2006

(54) BACKUP POWER SUPPLY DEVICE FOR A STORAGE DEVICE

(75) Inventor: Mitsuo Fukumori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 10/768,105

(22) Filed: Feb. 2, 2004

(65) Prior Publication Data

US 2005/0120251 A1 Jun. 2, 2005

(30) Foreign Application Priority Data

Nov. 28, 2003 (JP) ............................ 2003-400170

(51) Int. Cl.
*G06F 11/00* (2006.01)

(52) U.S. Cl. .......................... 714/14; 714/22; 713/320; 368/228

(58) Field of Classification Search .................. 714/14, 714/22; 713/340, 324; 368/228, 229; 365/229
See application file for complete search history.

(56) References Cited

U.S. PATENT DOCUMENTS

| | | | | |
|---|---|---|---|---|
| 4,143,283 | A * | 3/1979 | Graf et al. | 307/66 |
| 5,204,963 | A | 4/1993 | Noya et al. | 365/229 |
| 5,828,823 | A | 10/1998 | Byers et al. | 714/24 |
| 5,872,984 | A * | 2/1999 | Berglund et al. | 713/340 |
| 5,958,054 | A * | 9/1999 | O'Connor et al. | 713/300 |
| 6,079,026 | A * | 6/2000 | Berglund et al. | 713/340 |
| 6,658,542 | B2 | 12/2003 | Beardsley et al. | 711/162 |
| 2004/0054851 | A1 * | 3/2004 | Acton et al. | 711/118 |
| 2004/0078663 | A1 | 4/2004 | Inaba | 714/22 |
| 2004/0145347 | A1 * | 7/2004 | Yang | 320/116 |

FOREIGN PATENT DOCUMENTS

| | | |
|---|---|---|
| JP | 2000-357059 | 6/1999 |

* cited by examiner

*Primary Examiner*—Robert Beausoliel
*Assistant Examiner*—Christopher McCarthy
(74) *Attorney, Agent, or Firm*—Reed Smith LLP; Stanley P. Fisher, Esq.; Juan Carlos A. Marquez, Esq.

(57) ABSTRACT

An object of the invention is to make it possible to secure data retained by a cache memory with high reliability without increasing the size or cost of a storage device. When a host-handling processor and a disk processor have recognized occurrence of a power failure, operation of a storage device is continued for about one minute on DC power that is supplied from a battery module. After a lapse of one minute from the occurrence of the power failure, the host-handling processor interrupts the connection between the storage device and a host. Then, the host-handling processor turns off a SW of a host I/F and the disk processor writes, to an HDD, data that have been written to a cache memory. After completion of this processing, the disk processor turns off a SW of the disk I/F and a SW of the HDD. Then, the disk processor causes the battery module to supply DC power only to the cache memory.

5 Claims, 4 Drawing Sheets

BACKUP POWER SUPPLY DEVICE FOR A STORAGE DEVICE

CROSS-REFERENCE TO RELATED APPLICATION

This application relates to and claims priority from Japanese Patent Application No. 2003-400170, filed on Nov. 28, 2003, the entire disclosure of which is incorporated herein by reference.

BACKGROUND OF THE INVENTION

The present invention relates to a backup technique for a storage device that is equipped with a disk driving device for storing data received from an information processing apparatus and a cache memory for temporarily retaining data to be stored in the disk driving device.

A disk array device in which an uninterruptible power source having a minimum necessary rated output power is used as a means for reliably backing up a cache memory having a large storage capacity is known. In this disk array device, a write cache save area that is separate from a user data area is formed in each of a plurality of HDDs (hard disk drives) that constitute an arbitrary array among a plurality of arrays that are managed by a disk array controller having the cache memory. When a power failure has occurred, the contents of the cache memory are collectively written to the write cache save areas of the HDDs (JP-A-2000-357059).

Incidentally, to respond, at high speed, to access from a host computer (hereinafter referred to as "host") as a host apparatus of a hard disk storage device (hereinafter abbreviated as "storage device"), the hard disk storage device is equipped with a cache memory such as a DRAM which is volatile. With this configuration, data to be transferred from the host to the storage device are written to and retained temporarily by the cache memory before being written to the HDD. At this instant the storage device informs the host about the completion of data writing, whereby high-speed response to access from the host is secured.

On the other hand, with the recent trends of downsizing, open architecture, etc. in the IT environment, storage devices having the above kind of configuration have come to be used more frequently in environments where power failures occur at a high frequency. Therefore, it is important to take a proper measure to secure data retained by a volatile cache memory at the occurrence of a power failure. The following two methods are commonly employed as such a measure.

In the first method, when a power failure has occurred, the storage device is driven intermittently by supplying high power from a backup power source to the storage device in as short a time as several minutes and data retained by the cache memory are transferred to and written to the HDD. However, in this method, there may occur a case that data retained by the cache memory cannot be written to the HDD completely, because the processing of transferring the data inside the storage device and a circuit configuration relating to the writing of the data to the HDD are complex and the execution of the above kinds of processing requires a large number of devices. That is, there is a risk of losing part of data retained by the cache memory.

In the second method, when a power failure has occurred, low power is supplied from a backup power source to only the cache memory for as relatively long a time as several days to back up only the cache memory. This method has an advantage of high reliability because only a small number of devices need to be driven. However, the period during which data retained by the cache memory are secured, that is, the backup period, is limited because a battery module as the backup power source can supply power only in a period determined by its capacity.

As described above, it is difficult for either of the two methods to completely secure data retained by the cache memory. On the other hand, employing both methods increases the size of the battery module that is incorporated in the storage device. As a result, not only the size of the storage device itself but also the device cost is increased.

SUMMARY OF THE INVENTION

An object of the present invention is therefore to make it possible, in a storage device having a disk driving device and a cache memory, to secure data retained by the cache memory with high reliability without increasing the size or cost of the storage device.

A storage device according to a first aspect of the invention comprises a disk driving device for storing data that are received from an information processing apparatus; a cache memory for temporarily retaining data to be stored in the disk driving device; a backup power source for backing up individual units of the storage device including the disk driving device and the cache memory; a power failure detecting unit for checking a status of power supply from a power source; and a backup power supply control unit for distributing output power of the backup power source to the individual units of the storage device including the disk driving device and the cache memory in a first period that starts after detection of a power failure by the power failure detecting unit, and for supplying the cache memory with power that has been distributed to units excluding the cache memory after a lapse of the first period.

In a preferred embodiment according to the first aspect of the invention, the storage device further comprises a data accepting unit for accepting data from the information processing apparatus and writing the accepted data to the cache memory; and a data transfer unit for transferring data stored in the cache memory to the disk driving device, and the power failure detecting unit is provided in each of the data accepting unit and the data transfer unit, and the power failure detecting units detect a power failure by checking statuses of power supply from the power source in the data accepting unit and the data transfer unit, respectively, and communicating check results to each other.

In another embodiment according to the first aspect of the invention, the data accepting unit continues an operation of accepting data from the information processing apparatus and writing the accepted data to the cache memory until a lapse of a second period that starts after the detection of the power failure by the power failure detecting units and that is shorter than the first period.

In another embodiment according to the first aspect of the invention, the backup power supply control unit distributes the output power of the backup power source only to devices that are necessary to transfer the data from the cache memory to the disk driving device in a period from the lapse of the second period to the lapse of the first period.

In still another embodiment according to the first aspect of the invention, the storage device further comprises a status monitoring unit for monitoring statuses of the disk driving device and/or the cache memory, and the backup power supply control unit supplies the cache memory with power that has been distributed to units excluding the cache memory even before the lapse of the first period if the status monitoring unit judges on the basis of a monitoring result that writing to the disk driving device of the data transferred from the cache memory will not be completed in the period from the lapse of the second period to the lapse of the first period.

In another embodiment according to the first aspect of the invention, the storage device further comprises a dedicated power line for supplying output power of the backup power source to only the cache memory, and the dedicated power line comprises a switching unit for always establishing an electrical connection between the backup power source and the cache memory.

In another embodiment according to the first aspect of the invention, the backup power source comprises a series connection of a plurality of nickel-hydrogen batteries as storage batteries that are charged by a DC current that is supplied from the power source via an AC/DC conversion unit in a state that the power source is normal.

In yet another embodiment according to the first aspect of the invention, the backup power source comprises a storage battery monitoring unit for checking whether a voltage variation and variations of internal resistances of the nickel-hydrogen batteries that occur when the nickel-hydrogen batteries are charged by the DC current supplied from the power source are within allowable ranges by monitoring statuses of the nickel-hydrogen batteries.

In a further embodiment according to the first aspect of the invention, the backup power source is an uninterruptible power source that is externally connected to a power input terminal of the storage device, and at the occurrence of a power failure the backup power supply control unit supplies output power of the uninterruptible power source preferentially to the cache memory when writing to the disk driving device of data transferred from the cache memory has been completed.

A storage device according to a second aspect of the invention comprises a disk driving device for storing data that are received from an information processing apparatus; a cache memory for temporarily retaining data to be stored in the disk driving device; a backup power source for backing up individual units of the storage device including the disk driving device and the cache memory; power failure detecting units for checking a status of power supply from a power source; a backup power supply control unit for distributing output power of the backup power source to the individual units of the storage device including the disk driving device and the cache memory in a first period that starts after detection of a power failure by the power failure detecting unit, and for supplying the cache memory with power that has been distributed to units excluding the cache memory after a lapse of the first period; a status monitoring unit for monitoring statuses of the disk driving device and/or the cache memory; a dedicated power line for supplying output power of the backup power source to only the cache memory, the dedicated power line comprising a switching unit for always establishing an electrical connection between the backup power source and the cache memory; a data accepting unit for accepting data from the information processing apparatus and writing the accepted data to the cache memory; and a data transfer unit for transferring data stored in the cache memory to the disk driving device, wherein the power failure detecting units are provided in the data accepting unit and the data transfer unit, respectively, and detect a power failure by checking statuses of power supply from the power source in the data accepting unit and the data transfer unit, respectively, and communicating check results to each other, and the data accepting unit continues an operation of accepting data from the information processing apparatus and writing the accepted data to the cache memory until a lapse of a second period that starts after the detection of the power failure by the power failure detecting units and that is shorter than the first period; wherein the backup power supply control unit distributes the output power of the backup power source only to devices that are necessary to transfer the data from the cache memory to the disk driving device in a period from the lapse of the second period to the lapse of the first period; and wherein the backup power supply control unit supplies the cache memory with power that has been distributed to units excluding the cache memory even before the lapse of the first period if the status monitoring unit judges on the basis of a monitoring result that writing to the disk driving device of the data transferred from the cache memory will not be completed in the period from the lapse of the second period to the lapse of the first period.

DESCRIPTION OF THE SPECIFIC EMBODIMENTS

An embodiment of the present invention will be hereinafter described in detail with reference to the drawings.

Figure 1:
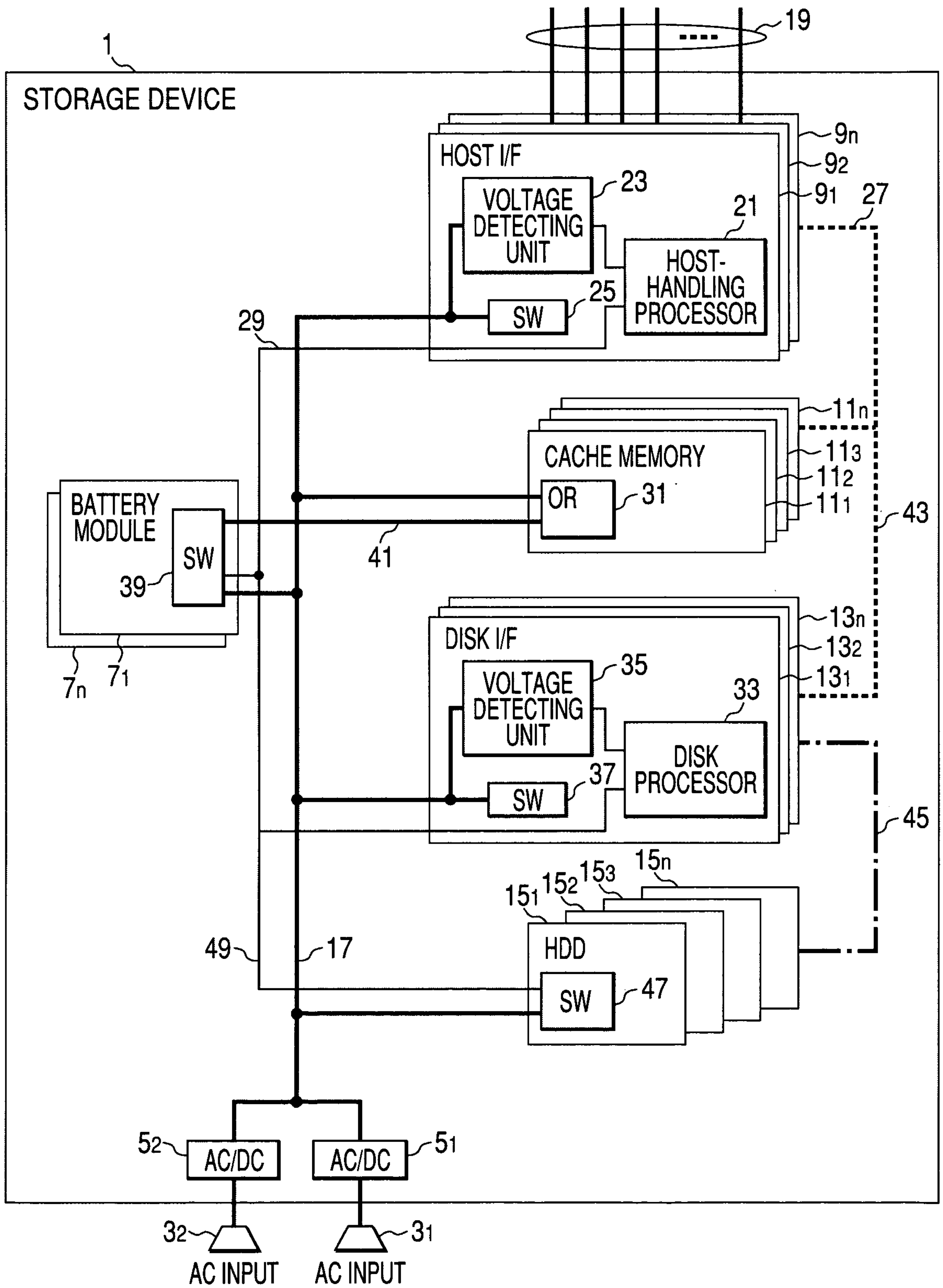
FIG. 1 is a block diagram showing the entire configuration of a storage device according to an embodiment of the present invention.

FIG. 1 is a block diagram showing the entire configuration of a storage device according to the embodiment of the invention.

As shown in FIG. 1, the storage device 1 is equipped with a plurality of (in FIG. 1, two) AC inputs; hereinafter referred to as "commercial power input units") $\mathbf{3}_1$ and $\mathbf{3}_2$, a plurality of (in FIG. 1, two) AC/DC converters $\mathbf{5}_1$ and $\mathbf{5}_2$, a plurality of battery modules $\mathbf{7}_1$–$\mathbf{7}_n$, a plurality of host interfaces (hereinafter abbreviated as "host I/F's") $\mathbf{9}_1$–$\mathbf{9}_n$, and a plurality of cache memories $\mathbf{11}_1$–$\mathbf{11}_n$. The storage device 1 is also equipped with a plurality of disk interfaces (hereinafter abbreviated as "disk I/F's") $\mathbf{13}_1$–$\mathbf{13}_n$ and a plurality of hard disk drives (hereinafter abbreviated as "HDDs") $\mathbf{15}_1$–$\mathbf{15}_n$.

In this embodiment, as shown in FIG. 1, the two commercial power input units $\mathbf{3}_1$ and $\mathbf{3}_2$ are provided. Therefore, the two AC/DC converters $\mathbf{5}_1$ and $\mathbf{5}_2$ that are supplied with AC power from the commercial power line via the respective commercial power input units $\mathbf{3}_1$ and $\mathbf{3}_2$ are provided so as to be same in number as the commercial power input units $\mathbf{3}_1$ and $\mathbf{3}_2$.

One of the reasons why in this embodiment the two commercial power input units $\mathbf{3}_1$ and $\mathbf{3}_2$ and the two AC/DC converters $\mathbf{5}_1$ and $\mathbf{5}_2$ are provided is that it is a common configuration that a storage device has two commercial power input units. Another reason is to enable continuation of the driving of the storage device 1 even if the input of power from the commercial power line via one of the commercial power input units $\mathbf{3}_1$ and $\mathbf{3}_2$ is stopped or the driving of one of the AC/DC converters $\mathbf{5}_1$ and $\mathbf{5}_2$ is stopped.

The AC/DC converters $\mathbf{5}_1$ and $\mathbf{5}_2$, which are parallel with each other, are connected to a DC power supply path 17. Each of the AC/DC converters $\mathbf{5}_1$ and $\mathbf{5}_2$ converts AC power that is supplied from the commercial power line via the associated one of the commercial power input units $\mathbf{3}_1$ and $\mathbf{3}_2$ into prescribed DC power and outputs the DC power to the DC power supply path 17.

Connected to the HDDs $\mathbf{15}_1$–$\mathbf{15}_n$, the disk I/F's $\mathbf{13}_1$–$\mathbf{13}_n$, the battery modules $\mathbf{7}_1$–$\mathbf{7}_n$, the cache memories $\mathbf{11}_1$–$\mathbf{11}_n$, and the host I/F's $\mathbf{9}_1$–$\mathbf{9}_n$, the DC power supply path 17 supplies the DC power that is output from the AC/DC converters $\mathbf{5}_1$ and $\mathbf{5}_2$ to those individual units as drive power therefor.

The battery modules $\mathbf{7}_1$–$\mathbf{7}_n$, the host I/F's $\mathbf{9}_1$–$\mathbf{9}_n$, the cache memories $\mathbf{11}_1$–$\mathbf{11}_n$, the disk I/F's $\mathbf{13}_1$–$\mathbf{13}_n$, and the HDDs $\mathbf{15}_1$–$\mathbf{15}_n$ have the same configuration in each set of units. Therefore, only the battery memory $\mathbf{7}_1$, the host I/F $\mathbf{9}_1$, the cache memory $\mathbf{11}_1$, the disk I/F $\mathbf{13}_1$, and the HDD $\mathbf{15}_1$ will be described below and the other battery modules $\mathbf{7}_2$–$\mathbf{7}_n$, host I/F's $\mathbf{9}_2$–$\mathbf{9}_n$, cache memories $\mathbf{11}_2$–$\mathbf{11}_n$, disk I/F's $\mathbf{13}_2$–$\mathbf{13}_n$, and HDDs $\mathbf{15}_2$–$\mathbf{15}_n$ will not be described.

The host I/F $\mathbf{9}_1$ is connected to a host computer (hereinafter referred to as "host"; not shown) as a host apparatus of the storage 1 via a host I/F cable 19, and is equipped with a host-handling processor 21, a voltage detecting unit 23, and a switch (hereinafter abbreviated as "SW") 25.

The SW 25 performs an on/off operation under the control of the host-handling processor 21, for example, and thereby connection/disconnection-controls the DC power supply to the host I/F $\mathbf{9}_1$ via the DC power supply path 17. The voltage detecting unit 23 detects the voltage of the DC power supply path 17 regularly (i.e., in a prescribed cycle) or when deemed appropriate and outputs a voltage detection signal to the host-handling processor 21.

The host-handling processor 21 performs processing of reading, regularly (i.e., in a prescribed cycle) or when deemed appropriate, the voltage detection signal that is output from the voltage detecting unit 23, and checking whether the voltage detection signal indicates a normal value. If judging as a result of the check that the voltage detection signal indicates a normal value, the host-handling processor 21 performs processing of writing, to the (prescribed) cache memory $\mathbf{11}_1$, via an internal data transfer path 27, data that are transferred from the host (not shown) via the host I/F cable 19 as a data write operation of storing the data in the storage device 1.

If judging as a result of the check that the voltage detection signal indicates voltage reduction, the host-handling processor 21 performs processing of judging whether a power failure relating to the entire storage device 1 has occurred or a power failure (voltage reduction) has been caused by a failure (individual failure) of the host I/F $\mathbf{9}_1$, for example, by communicating with a disk processor 33 of the disk I/F $\mathbf{13}_1$ via a battery module control path 29. The host-handling processor 21 performs processing of interrupting a data transfer from the host (not shown) via the host I/F cable 19 not only if judging that a power failure has occurred in the commercial power line (i.e., a power failure relating to the entire storage device 1 has occurred) but also if judging that a power failure (voltage reduction) has been caused by a failure (individual failure) of the host I/F $\mathbf{9}_1$, for example (if judging that the interruption is necessary). In addition to this processing, the host-handling processor 21 performs processing of turning off the SW 25 and processing of turning off, via the battery module control path 29, a DC-power-supply-path-17-side contact (that is in an on-state) of a SW 39 of the battery module $\mathbf{7}_1$. The other host-handling processors (not shown) of the host I/F's $\mathbf{9}_2$–$\mathbf{9}_n$ perform the same processing as the host-handling processor 21 does.

The cache memory $\mathbf{11}_1$ is equipped with an OR circuit (hereinafter referred to as "cache memory power supply OR circuit") 31 that is supplied with DC power not only from the DC power supply path 17 but also the battery module $\mathbf{7}_1$ via a memory power supply path 41. In a normal state (i.e., when the commercial power line is normal), the cache memory $\mathbf{11}_1$ is driven receiving DC power that is supplied from the AC/DC converters $\mathbf{5}_1$ and $\mathbf{5}_2$ via the cache memory power supply OR circuit 31 and the DC power supply path 17. In a power failure state (i.e., when the commercial power line is shut off), the cache memory $\mathbf{11}_1$ is driven receiving DC power that is supplied from the battery module $\mathbf{7}_1$ via the cache memory power supply OR circuit 31 and the memory power supply path 41. The other cache memories $\mathbf{11}_2$–$\mathbf{11}_n$ are configured and driven in the same manners as the cache memory $\mathbf{11}_1$.

Usually, each of the cache memories $\mathbf{11}_2$–$\mathbf{11}_n$ is doubled so as to be fault-tolerant, that is, tolerant of a failure therein.

The disk I/F $\mathbf{13}_1$ is connected to the cache memory $\mathbf{11}_1$ via an internal data transfer path 43 and is also connected to the HDD $\mathbf{15}_1$ via an HDD transfer path 45. The disk I/F $\mathbf{13}_1$ is equipped with a disk processor 33, a voltage detecting unit 35, and a switch (hereinafter abbreviated as "SW") 37. The other disk I/F's $\mathbf{13}_2$–$\mathbf{13}_n$ are configured in the same manner as the disk I/F $\mathbf{13}_1$.

The SW 37 performs an on/off operation under the control of the disk processor 33, for example, and thereby connection/disconnection-controls the DC power supply to the disk I/F $\mathbf{13}_1$ via the DC power supply path 17. The voltage detecting unit 35 detects the voltage of the DC power supply path 17 regularly (i.e., in a prescribed cycle) or when deemed appropriate and outputs a voltage detection signal to the disk processor 33.

The disk processor 33 performs processing of reading, regularly (i.e., in a prescribed cycle) or when deemed appropriate, the voltage detection signal that is output from the voltage detecting unit 35, and checking whether the voltage detection signal indicates a normal value. If judging as a result of the check that the voltage detection signal indicates a normal value, the disk processor 33 performs processing of reading out data that were written to the (prescribed) cache memory $\mathbf{11}_1$ via the internal data transfer path 27 and writing the data to the HDD $\mathbf{15}_1$ at a prescribed position via the HDD transfer path 45.

If judging as a result of the check that the voltage detection signal indicates voltage reduction, the disk processor 33 performs processing of judging whether a power failure relating to the entire storage device 1 has occurred or a power failure (voltage reduction) has been caused by a failure (individual failure) of the disk I/F $\mathbf{13}_1$, for example, by communicating with the host-handling processor 21 of the host I/F $\mathbf{9}_1$ via the battery module control path 29. The disk processor 33 performs processing of turning off the SW 37 and processing of turning off a SW 47 of the HDD $\mathbf{15}_1$ via the battery module control path 29 not only if judging that a power failure has occurred in the commercial power line (i.e., a power failure relating to the entire storage device 1 has occurred) but also if judging that a power failure (voltage reduction) has been caused by a failure (individual failure) of the disk I/F $\mathbf{13}_1$, for example (if judging that the turning-off is necessary).

In addition to the above processing, the disk processor 33 performs processing of monitoring the status of the cache memory $11_1$ via the internal data transfer path 43, for example, and processing of monitoring the status of the HDD $15_1$ via the HDD transfer path 45, for example. If judging that it is necessary to do so, the disk processor 33 stops processing of reading out data that were written to in the cache memory $11_1$ via the internal data transfer path 43 and writing the data to the HDD $15_1$ at a prescribed position via the HDD transfer path 45.

Driven receiving DC power via a switch (hereinafter abbreviated as "SW") 47 and the DC power supply path 17, the HDD $15_1$ stores data that are read from the cache memory $11_1$ via the internal data transfer path 43 and transferred via the HDD transfer path 45 by the disk processor 33. The other HDDs $15_2$–$15_n$ are configured and operate in the same manners as the HDD $15_1$.

The battery module $7_1$ is equipped with a switch (hereinafter abbreviated as "SW") 39 having a DC-power-supply-path-17-side contact and a memory-power-supply-path-41-side contact and is connected to the host I/F $9_1$ (and the host I/F's $9_2$–$9_n$), the cache memory $11_1$ (and the cache memories $11_2$–$11_n$), the disk I/F $13_1$ (and the disk I/F's $13_2$–$13_n$), and the HDD $15_1$ (and the HDDs $15_2$–$15_n$) via the DC-power-supply-path-17-side contact and the DC power supply path 17. The battery module $7_1$ is also connected to the cache memory $11_1$ (and the cache memories $11_2$–$11_n$) via the memory-power-supply-path-41-side contact of the SW 39 and the memory power supply path 41.

In a normal state (i.e., when the commercial power line is normal), the battery module $7_1$ is charged by a DC current that is supplied from the AC/DC converters $5_1$ and $5_2$ via the DC power supply path 17. On the other hand, in a power failure state (i.e., when the commercial power line is shut off), the supply of a DC current from the AC/DC converters $5_1$ and $5_2$ to the battery module $7_1$ is stopped. Therefore, unless the DC-power-supply-path-17-side contact of the SW 39 is open, the charge that has been accumulated in the battery module $7_1$ in the normal state (i.e., the commercial power line has been normal) is supplied as DC power to the host I/F $9_1$ (and the host I/F's $9_2$–$9_n$), the cache memory $11_1$ (and the cache memories $11_2$–$11_n$), the disk I/F $13_1$ (and the disk I/F's $13_2$–$13_n$), and the HDD $15_1$ (and the HDDs $15_2$–$15_n$) via the DC-power-supply-path-17-side contact and the DC power supply path 17.

If the DC-power-supply-path-17-side contact of the SW 39 is opened in a power failure state (i.e., the commercial power line is shut off) by a control signal that is supplied from the host-handling processor 21 or the disk processor 33 via the battery module control path 29, the charge that has been accumulated in the battery module $7_1$ in the normal state (i.e., the commercial power line has been normal) is supplied as DC power to only the cache memory $11_1$ via the closed memory-power supply-path-41-side contact of the SW 39 and the memory power supply path 41. The other battery modules $7_2$–$7_n$ operate in the same manner as the battery module $7_1$.

In this embodiment, the battery (storage battery) capacity of the battery modules $7_1$–$7_n$ is distributed so that battery modules can be added in a scalable manner to adapt to the hardware configuration of the storage device 1. This is to make it possible to incorporate expensive batteries (storage batteries) in accordance with a battery (storage battery) capacity that is required by the storage device 1. In this case, it is necessary that battery modules $7_1$–$7_n$ operate in parallel. Further, in this embodiment, since each of the cache memories $11_1$–$11_n$ is doubled, each of the battery modules $7_1$–$7_n$ is doubled so as to conform to the doubling of each of the cache memories $11_1$–$11_n$. This increases the security of data stored in the cache memories $11_1$–$11_n$.

Next, the operations of the individual units of the above-configured storage device 1 will be described.

First, in a normal state (i.e., when the commercial power line is normal), when data are transmitted from the host (not shown) to the host I/F $9_1$ via the host I/F cable 19, the host-handling processor 21 writes the data to the prescribed cache memory $11_1$ via the internal data transfer path 27 and informs the host (not shown) about completion of the data writing.

The data that have been written to the cache memory $11_1$ by the host-handling processor 21 are successively read from the cache memory $11_1$ via the internal data transfer path 43 and written to the HDD $15_1$ at prescribed positions via the HDD transfer path 45 by the disk processor 33.

If recognizing that the voltage detection signal from the voltage detecting unit 23 of the host I/F $9_1$ indicates voltage reduction, the host-handling processor 21 of the host I/F $9_1$ inquires of the disk processor 33 of the disk I/F $13_1$ whether it has recognized that the voltage detection signal from the voltage detecting unit 35 of the disk I/F $13_1$ indicates voltage reduction by communicating with the disk processor 33 via the internal data transfer paths 27 and 43. If the disk processor 33 has recognized that the voltage detection signal from the voltage detecting unit 35 indicates voltage reduction, the host-handling processor 21 recognizes that a power failure relating to the entire storage device 1 has occurred.

On the other hand, if the disk processor 33 has not recognized voltage reduction, the host-handling processor 21 judges that only the host I/F $9_1$ is in failure (i.e., an individual failure). Conversely, if the disk processor 33 has recognized voltage reduction but the host-handling processor 21 has not recognized voltage reduction, the disk processor 33 judges that only the disk I/F $13_1$ is in failure (i.e., an individual failure).

If both of the host-handling processor 21 and the disk processor 33 have recognized voltage reduction in the DC power supply path 17 and hence have judged that a failure relating to the entire storage device 1 has occurred, the storage device 1 as a whole maintains a current operation for about one minute with supply of DC power from the battery module $7_1$ via the DC power supply path 17. This is because in general most of power failures (of the commercial power line) are caused by events that last only several seconds such as a lightning strike and switching between power transmission systems and a stop of operation of a system including the storage device 1 due to an instantaneous power failure can be prevented by maintaining the operation of the storage device 1 for about one minute. Another reason is that at the occurrence of a power failure that will last nearly one minute the host (not shown) side also needs to perform processing to cope with the power failure (power failure processing). If the operation of the storage device 1 were stopped in response to an instantaneous power failure, the host side could not complete the power failure processing and much time would be needed to restart the system including the storage device 1 after returning of power failure.

Where a power failure (of the commercial power line) lasts more than one minute, the host-handling processor 21 interrupts the connection between the storage device 1 and the host (not shown) using the host I/F cable 19. This is because if during a power failure the host I/F $9_1$ indefinitely continues to receive data that are transferred from the host (not shown), the data stored in the cache memory $11_1$ of the storage device 1 would continue to be updated and hence the data securing processing of the storage device 1 would not be completed.

Then, the host-handling processor 21 turns off the SW 25 to separate the host I/F $\mathbf{9}_1$ from the DC power supply path 17 and thereby reduce the load of the battery module $\mathbf{7}_1$. In parallel with this processing, the data that have been written to the cache memory $\mathbf{11}_1$ by the host-handling processor 21 are written to the HDD $\mathbf{15}_1$ by the disk processor 33. Usually, the data stored in the cache memory $\mathbf{11}_1$ are written to the HDD $\mathbf{15}_1$ for reliable storage in about 10 minutes unless such hardware as the cache memory $\mathbf{11}_1$ or the HDD $\mathbf{15}_1$ is in failure. Upon completion of this processing, the SW 37 of the disk I/F $\mathbf{13}_1$ that is hardware involved in the data writing to the HDD $\mathbf{15}_1$ and the SW 47 of the HDD $\mathbf{15}_1$ are turned off by the disk processor 33, whereby the power supply to the disk I/F $\mathbf{13}_1$ and HDD $\mathbf{15}_1$ is stopped. The capacity margin of the battery module $\mathbf{7}_1$ is thus increased.

Recognizing that the data writing to the HDD $\mathbf{15}_1$ by the disk processor 33 has finished completely, the disk processor 33 turns off the DC-power-supply-path-17-side contact of the SW 39 of the battery module $\mathbf{7}_1$ via the battery module control path 29 so that only the cache memory $\mathbf{11}_1$ will be supplied with DC power from the battery module $\mathbf{7}_1$ (via the memory power supply path 41). This makes it possible to store, in the cache memory $\mathbf{11}_1$, data that were processed by the host (not shown) before the power failure. Therefore, when the power failure has ended and the system (including the storage device 1) has been restarted, the system can exhibit high-speed response.

Incidentally, in storage devices like the storage device 1 according to the invention that incorporate a plurality of HDDs, as is apparent from the fact that the reliability of the HDDs is secured by employing the RAID (redundant array of independent inexpensive disks) configuration, it is not assured that data stored in the cache memory $\mathbf{11}_1$ are transferred to the HDD $\mathbf{15}_1$ for reliable storage before the charge that is accumulated in the battery module $\mathbf{7}_1$ is used up.

In view of the above, the disk processor 33 stops the operation of writing data to the HDD $\mathbf{15}_1$ at an instant when it has turned out by monitoring the statuses of the cache memory $\mathbf{11}_1$ and the HDD $\mathbf{15}_1$ that the data writing to the HDD $\mathbf{15}_1$ cannot be finished in a prescribed time because of a failure or the like of such hardware as the cache memory $\mathbf{11}_1$ and the HDD $\mathbf{15}_1$. The disk processor 33 then turns off the DC-power-supply-path-17-side contact of the SW 39 of the battery module $\mathbf{7}_1$ via the battery module control path 29 and thereby interrupts the supply of DC power to the HDD $\mathbf{15}_1$ and the disk I/F $\mathbf{13}_1$ so that only the cache memory $\mathbf{11}_1$ will be supplied with DC power from the battery module $\mathbf{7}_1$ (via the memory power supply path 41).

As a result, the battery module $\mathbf{7}_1$ retains, in the form of charge, DC power that should otherwise be supplied to the disk I/F $\mathbf{13}_1$ and the HDD $\mathbf{15}_1$. The backup time of the cache memory $\mathbf{11}_1$ is elongated by supplying such charge retained by the battery module $\mathbf{7}_1$ to the cache memory $\mathbf{11}_1$ as DC power. The cache memory $\mathbf{11}_1$ can be backed up for a longer time than in the case of continuing the supply of DC power to the disk I/F $\mathbf{13}_1$ and the HDD $\mathbf{15}_1$.

Figure 2:
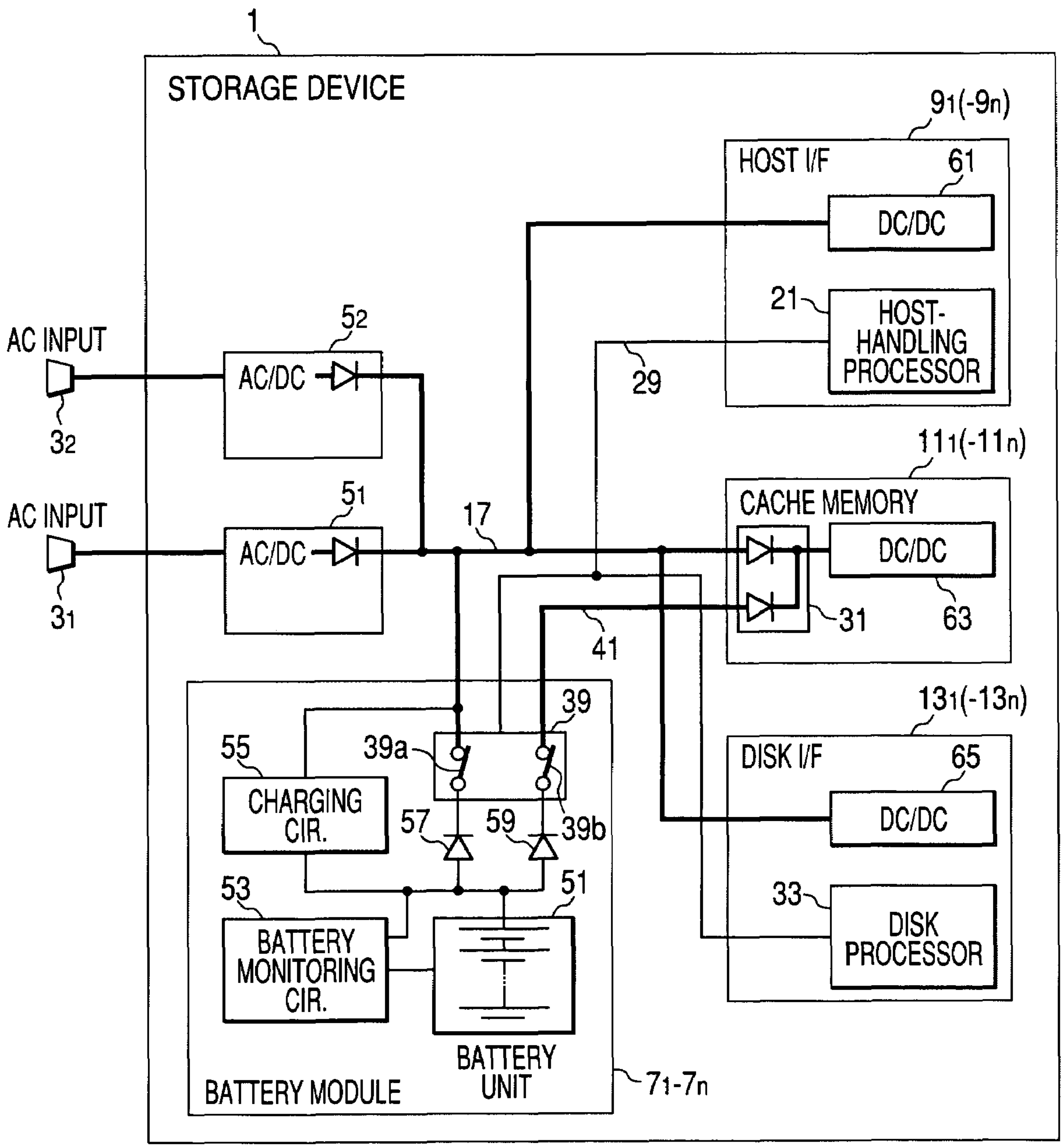
FIG. 2 is a block diagram showing the circuit configuration of part of the devices of the storage device of FIG. 1, that is, AC/DC converters, cache memories, battery modules, host I/F's, and disk I/F's.

FIG. 2 is a block diagram showing the circuit configuration of part of the devices of the storage device 1 of FIG. 1, that is, the AC/DC converters $\mathbf{5}_1$ and $\mathbf{5}_2$, the cache memories $\mathbf{11}_1$–$\mathbf{11}_n$, the battery modules $\mathbf{7}_1$–$\mathbf{7}_n$, the host I/F's $\mathbf{9}_1$–$\mathbf{9}_n$, and the disk I/F's $\mathbf{13}_1$–$\mathbf{13}_n$.

As shown in FIG. 2, each of the battery modules $\mathbf{7}_1$–$\mathbf{7}_n$ is equipped with, in addition to the SW 39, a battery unit 51, a battery monitoring circuit 53, a charging circuit 55, reverse-blocking diodes 57 and 59. The SW 39 has the contacts that were described above with reference to FIG. 1, that is, a DC-power-supply-path-17-side normally-closed contact 39*a* and a memory-power-supply-path-41-side normally-closed contact 39*b*.

The reason why the contacts 39*a* and 39*b* of the SW 39 are both normally-closed contacts is to slowly switch, from the AC/DC converters $\mathbf{5}_1$ and $\mathbf{5}_2$ to the battery modules $\mathbf{7}_1$–$\mathbf{7}_n$, the units for supplying DC power to the loads, that is, the host I/Fs $\mathbf{9}_1$–$\mathbf{9}_n$, the cache memory $\mathbf{11}_1$–$\mathbf{11}_n$, the disk I/F $\mathbf{13}_1$–$\mathbf{13}_n$, and the HDD $\mathbf{15}_1$–$\mathbf{15}_n$, when a power failure has occurred in the commercial power line.

Where the DC voltage of the battery unit 51, which is usually set much lower than the DC voltage of the AC/DC converters $\mathbf{5}_1$ and $\mathbf{5}_2$, is set so high as to be very close to the DC voltage of the AC/DC converters $\mathbf{5}_1$ and $\mathbf{5}_2$, the charge that has been supplied from the battery unit 51 via the reverse-blocking diode 57 and the contact 39*a* and accumulated in the DC power supply path 17 may be released even in a state that the commercial power line is normal. To prevent this phenomenon, it is necessary that the contact 39*a* be a normally-open contact. In this case, it is necessary to close the contact 39*a* upon occurrence of a power failure of the commercial power line. However, there may occur a problem that the voltage of the DC power supply path 17 lowers before the contact 39*a* is closed and the supply of DC power from the battery unit 51 is started. There is another risk that the output current of the battery unit 51 that has been zero so far increases rapidly and the voltage of the DC power supply path 17 lowers being influenced by a transient characteristic of the battery modules $\mathbf{7}_1$–$\mathbf{7}_n$ that is caused by the rapid increase of the output current.

The battery unit 51 is a series connection of a plurality of storage batteries that are, in this embodiment, nickel-hydrogen batteries. The charging capacity of the series connection of storage batteries is set higher than a value corresponding to the DC voltage of the AC/DC converters $\mathbf{5}_1$ and $\mathbf{5}_2$. If the DC voltage of the AC/DC converters $\mathbf{5}_1$ and $\mathbf{5}_2$ is 56 V, for example, the DC voltage of the battery unit 51 is set at 36 to 54 V. The value 36 V is the lower limit of drive voltages of communications apparatus. The drive voltages of communications apparatus will be described later in detail.

Where the storage batteries that constitute the battery unit 51 are nickel-hydrogen batteries, each nickel-hydrogen battery as what is called a unit cell has a full charging voltage of 1.5 V and a final discharge voltage of DC 1.0 V. Therefore, to attain the DC voltage 36 to 54 V of the entire battery unit 51, 36 nickel-hydrogen batteries should be connected to each other in series. In other words, the desired backup voltage can be obtained in an optimum state by connecting 36 nickel-hydrogen batteries to each other in series.

In a state that the commercial power line is normal, the series connection of storage batteries constituting the battery unit 51 is charged by a DC current that is supplied from the AC/DC converters $\mathbf{5}_1$ and $\mathbf{5}_2$ via the DC power supply path 17 and the charging circuit 55.

The charge that has been accumulated in the battery unit 51 in this manner in a state that the commercial power line is normal flows, as a DC current, to the DC power supply path 17 via the reverse-blocking diode 57 and the normally-closed contact 39*a* when a power failure has occurred in the commercial power line and the DC voltage of the AC/DC converters $\mathbf{5}_1$ and $\mathbf{5}_2$ decreases from a prescribed voltage (e.g., 56 V) to become lower than the full charging voltage (e.g., 54 V) of the entire battery unit 51. As a result, DC power is supplied to the host I/F's $9_1$–$9_n$, the cache memories $11_1$–$11_n$, the disk I/F's $13_1$–$13_n$, and the HDDs $15_1$–$15_n$ (see FIG. 1) via the DC power supply path 17.

If the contact 39a is opened by the disk processor 33 or the like in the above power failure, the charge stored in the battery unit 51 flows, as a DC current, to the memory power supply path 41 via the reverse-blocking diode 59 and the normally-closed contact 39b and supplied, as DC power, only to the cache memories $11_1$–$11_n$ via the memory power supply path 41.

The battery monitoring circuit 53 monitors the battery unit 51 to check whether the voltage variation of the battery unit 51 is kept within a prescribed range and whether the variation among the internal resistance values of the storage batteries is within an allowable range when the battery unit 51 is charged by the DC current that is supplied from the AC/DC converters $5_1$ and $5_2$ via the DC power supply path 17 and the charging circuit 55 (what is called a health check on the battery unit 51). The reason why the battery monitoring circuit 53 monitors the battery unit 51 to check whether the voltage variation of the battery unit 51 is kept within the prescribed range and whether the variation among the internal resistance values of the storage batteries is within the allowable range is that the output side of each of the battery modules $7_1$–$7_n$ is provided with the reverse-blocking diodes 57 and 59 but is not provided with a DC/DC converter for DC voltage reduction. The omission of a DC/DC converter for DC voltage reduction can decrease the battery capacity reduction by about 10% in each of the battery modules $7_1$–$7_n$. If the battery monitoring circuit 53 finds a certain abnormality in the battery unit 51 as a result of the above monitoring, a storage battery where the abnormality has been found should be replaced.

Each of the host I/F's $9_1$–$9_n$, the cache memories $11_1$–$11_n$, the disk I/F's $13_1$–$13_n$, and the HDDs $15_1$–$15_n$ (see FIG. 1) is equipped with a DC/DC converter 61, 63, or 65 for converting, to a desired voltage, the DC voltage that is supplied from the AC/DC converters $5_1$ and $5_2$ or the battery modules $7_1$–$7_n$ via the DC power supply path 17. The DC/DC converters 61, 63, and 65 have an input range of 36 to 75 V that is commonly employed in communications apparatus, for example. With this measure, when the commercial power line is free of a power failure, the host I/F's $9_1$–$9_n$, the cache memories $11_1$–$11_n$, the disk I/F's $13_1$–$13_n$, and the HDDs $15_1$–$15_1$ (see FIG. 1) are driven receiving DC voltage of 56 V, for example, from the AC/DC converters $5_1$ and $5_2$ via the DC power supply path 17. When a power failure has occurred in the commercial power line, they are driven receiving a DC voltage of 36 to 54 V, for example, from the battery modules $7_1$–$7_n$ via the DC power supply path 17.

The reason why as described above the DC/DC converter 61, 63, or 65 is provided in each of the host I/F's $9_1$–$9_n$, the cache memories $11_1$–$11_n$, the disk I/F's $13_1$–$13_n$, and the HDDs $15_1$–$15_n$ (see FIG. 1) is that unless the voltage is regulated in close proximity to each of these devices which are electronic devices that operate at high speeds and consume much power the power supply cannot compensate for a rapidly increasing transient current in each electronic device. For example, each of the cache memories $11_1$–$11_n$ incorporates a memory (not shown) that operates at a low voltage (e.g., 2.5 V) and consumes a large current. Unless the voltage is decreased at a position as close to the memory as a load as possible, an additional voltage drop occurs after the voltage reduction by the DC/DC converter and before the supply of a resulting (DC) voltage to the load to possibly cause an event that memory (not shown) does not operate.

As shown in FIG. 2, each of the AC/DC converters $5_1$ and $5_2$ is equipped with a rectification circuit and the cache memory power supply OR circuit 31 is an OR circuit that consists of two diodes, for example. Although each of the host I/F's $9_1$–$9_n$ is equipped with the voltage detecting unit 23 and the SW 25 (see FIG. 1) in addition to the host-handling processor 21 and a DC/DC converter 61, the voltage detecting unit 23 and the SW 25 are not shown in FIG. 2. Although each of the disk I/F's $13_1$–$13_n$ is equipped with the voltage detecting unit 35 and the SW 37 (see FIG. 1) in addition to the disk processor 33 and a DC/DC converter 65, the voltage detecting unit 35 and the SW 37 are not shown in FIG. 2.

Figure 3:
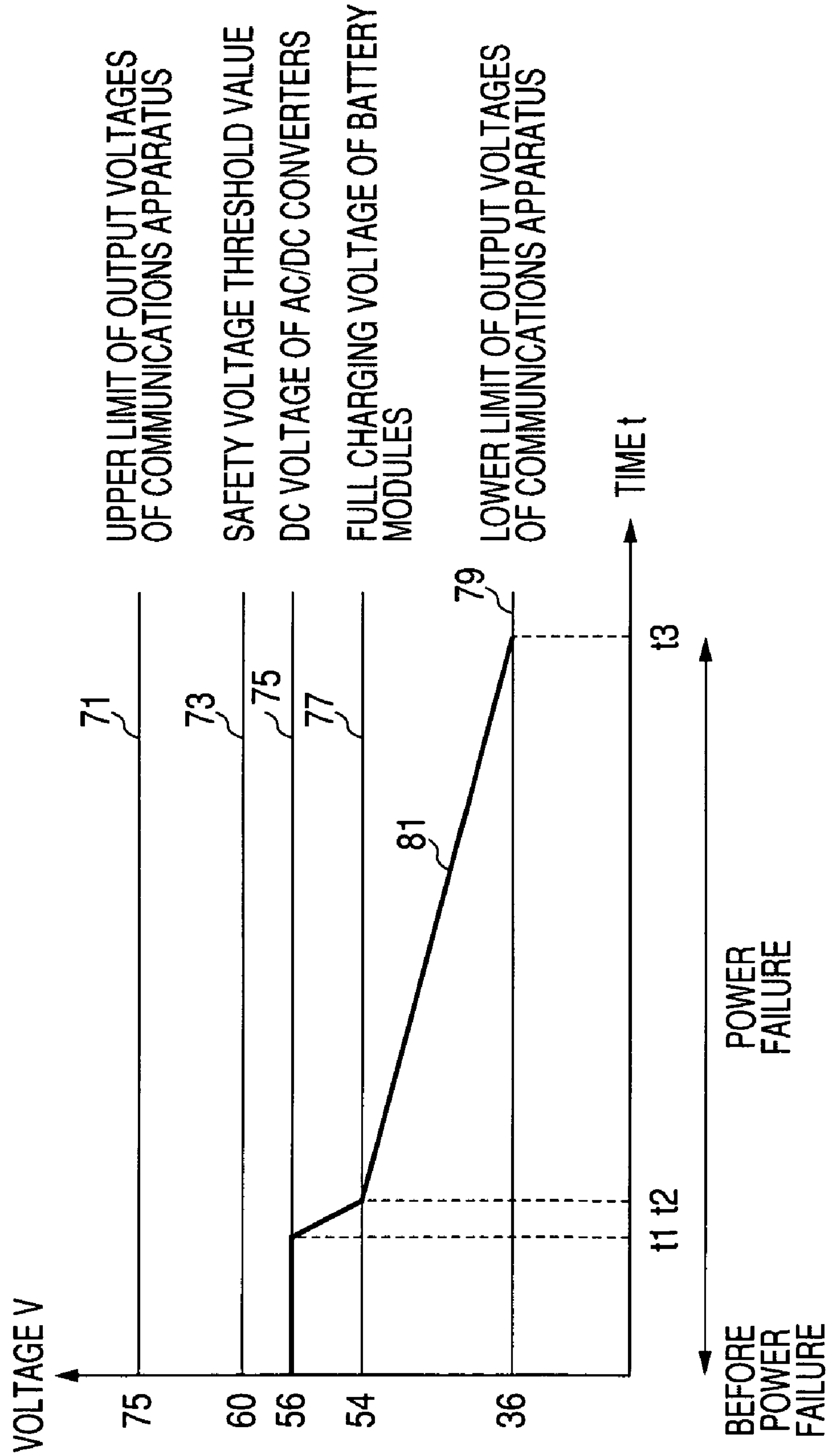
FIG. 3 is a graph showing a variation of the DC voltage of a DC power supply path shown in FIGS. 1 and 2.

FIG. 3 is a graph showing a variation of the DC voltage of the DC power supply path 17 shown in FIGS. 1 and 2.

In FIG. 3, straight lines 71 and 79 indicate an upper limit (75 V) and a lower limit (36 V) of output voltages of general communications apparatus. A straight line 73 indicates a safety voltage threshold value 60 V according to international safety standards. A straight line 75 indicates a DC voltage of the AC/DC converters $5_1$ and $5_2$, which is 56 V, for example. A straight line 77 indicates a full charging voltage of the battery modules $7_1$–$7_n$, which is 54 V, for example.

The output voltage of the AC/DC converters $5_1$ and $5_2$ is set lower than the safety voltage threshold value 73. This is because if the output voltage of the AC/DC converters $5_1$ and $5_2$ is higher than the safety voltage threshold value 73 it is necessary to reinforce insulation measures in the storage device 1. The reinforcement of the insulation measures causes many disadvantages in hardware configuration.

The reason why the full charging voltage 77 of the battery modules $7_1$–$7_n$ is set lower than the DC voltage of the AC/DC converters $5_1$ and $5_2$ in a state that the commercial power line is normal is to prevent a current flow from the battery modules $7_1$–$7_n$ to the DC power supply path 17 until the DC voltage of the AC/DC converters $5_1$ and $5_2$ becomes lower than the full charging voltage 77 of the battery modules $7_1$–$7_n$ after occurrence of a power failure in the commercial power line.

A curve 81 represents a variation of the DC voltage of the DC power supply path 17. When the commercial power line is normal, the DC voltage is equal to, for example, the value (56 V) of line 75. When a power failure occurs at time $t_1$ in the commercial power line, the DC voltages starts to decrease. At time $t_2$ when the DC voltage becomes equal to the value of line 77, that is, the full charging voltage (54 V) of the battery modules $7_1$–$7_n$, discharge from the battery modules $7_1$–$7_n$ is started. After time $t_2$, the DC voltage of the DC power supply path 17 decreases as the DC voltage of the battery modules $7_1$–$7_n$ decreases. At time $t_3$, the DC voltage reaches the lower limit (36 V) of output voltages of general communications apparatus.

As a modification of the above-described embodiment of the invention, a configuration is conceivable in which an uninterruptible power source (hereinafter abbreviated as "UPS") as an external circuit is connected to the commercial power input units $3_1$ and $3_2$ of the storage device 1. In this configuration, when a power failure has occurred in the commercial power line, DC power is supplied for a while from the UPS to the DC power supply path 17 via the commercial power input units $3_1$ and $3_2$. Therefore, during that period, data that were written to in the cache memories $11_1$–$11_n$ can be transferred to and stored in the HDDs $15_1$–$15_n$. In this case, the method for securing data that are stored in the cache memories $11_1$–$11_n$ can be diversified by setting the control operations of the host-handling processor 21 and the disk processor 33 in advance so as to be able to positively perform only the operations of backing up the cache memories $\mathbf{11}_1$–$\mathbf{11}_n$.

As another modification of the above-described embodiment of the invention, a storage device 1 is conceivable in which the capacities of the battery modules $\mathbf{7}_1$–$\mathbf{7}_n$ are such that each of the battery modules $\mathbf{7}_1$–$\mathbf{7}_n$ incorporates five storage batteries each being capable of producing DC electric energy of 200 W·h, for example. That is, a battery module capacity of 200 W·h×5=1,000 W·h is prepared in the storage device 1.

Incidentally, electric energy that is necessary to complete the processing of transferring data that are stored in the cache memories $\mathbf{11}_1$–$\mathbf{11}_n$ to the HDDs $\mathbf{15}_1$–$\mathbf{15}_n$ and storing the data there at the occurrence of a power failure amounts to 3 kW×10 min (1/6 h)=500 W·h, for example. And electric energy that is necessary to back up only the cache memories $\mathbf{11}_1$–$\mathbf{11}_n$ for 24 hours is equal to 20 W×24 h=480 W·h, for example. Therefore, in total, DC electric energy of 980 W·h is needed to back up data stored in the cache memories $\mathbf{11}_1$–$\mathbf{11}_n$. The above-mentioned battery module capacity of 1,000 W·h that is prepared in the storage device 1 is sufficient for this purpose. The battery module capacity can thus be prepared which can back up the cache memories $\mathbf{11}_1$–$\mathbf{11}_n$ for a maximum of 48 hours (960 W·h) in the case where only the cache memories $\mathbf{11}_1$–$\mathbf{11}_n$ should be backed up and which can cope with a continuous power failure in the case of the operation of writing data to the HDDs $\mathbf{15}_1$–$\mathbf{15}_n$.

Figure 4:
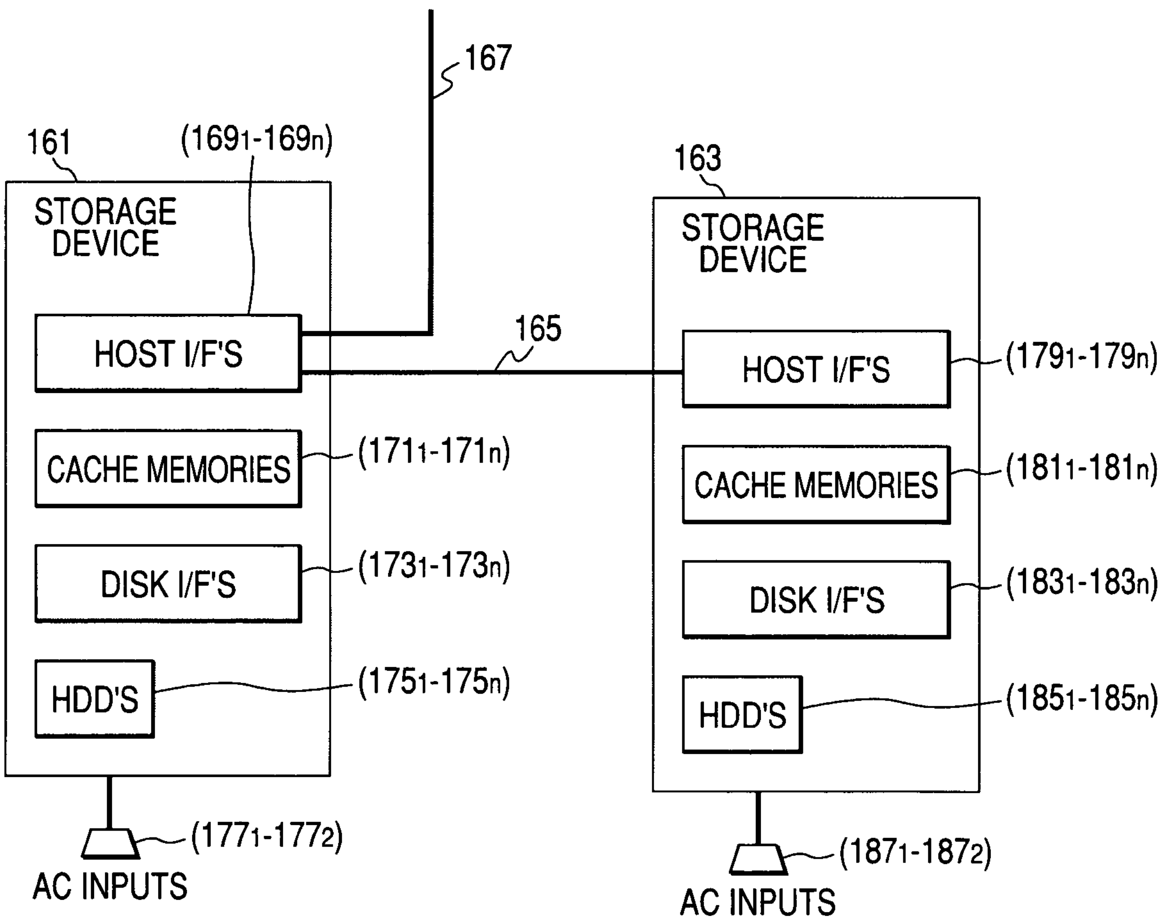
FIG. 4 is a block diagram showing the entire configuration of a virtual disk system having storage devices of FIG. 1 according to the embodiment of the invention.

FIG. 4 is a block diagram showing the entire configuration of a virtual disk system having storage devices of FIG. 1 according to the embodiment of the invention.

As shown in FIG. 4, this virtual disk system is equipped with two storage devices 161 and 163 having the same configuration as the storage device 1 of FIG. 1. The storage device 161 is a main storage device and the storage device 163 is an auxiliary storage device. Host I/F's $\mathbf{169}_1$–$\mathbf{169}_n$, cache memories $\mathbf{171}_1$–$\mathbf{171}_n$, disk I/F's $\mathbf{173}_1$–$\mathbf{173}_n$, HDDs $\mathbf{175}_1$–$\mathbf{175}_n$, and AC inputs (commercial power input units) $\mathbf{177}_1$ and $\mathbf{177}_2$ that are provided in the storage device 161 have the same configurations as the host I/F's $\mathbf{9}_1$–$\mathbf{9}_n$, the cache memories $\mathbf{11}_1$–$\mathbf{11}_n$, the disk I/F's $\mathbf{13}_1$–$\mathbf{13}_n$, the HDDs $\mathbf{15}_1$–$\mathbf{15}_n$, and the AC inputs $\mathbf{3}_1$ and $\mathbf{3}_2$ shown in FIG. 1, respectively.

Host I/F's $\mathbf{179}_1$–$\mathbf{179}_n$, cache memories $\mathbf{181}_1$–$\mathbf{181}_n$, disk I/F's $\mathbf{183}_1$–$\mathbf{183}_n$, HDDs $\mathbf{185}_1$–$\mathbf{185}_n$, and AC inputs (commercial power input units) $\mathbf{187}_1$ and $\mathbf{187}_2$ that are provided in the storage device 163 also have the same configurations as the host I/F's $\mathbf{9}_1$–$\mathbf{9}_n$, the cache memories $\mathbf{11}_1$–$\mathbf{11}_n$, the disk I/F's $\mathbf{13}_1$–$\mathbf{13}_n$, the HDDs $\mathbf{15}_1$–$\mathbf{15}_n$, and the AC inputs $\mathbf{3}_1$ and $\mathbf{3}_2$ shown in FIG. 1, respectively. Although not shown in FIG. 4, both storage devices 161 and 163 are equipped with the same AC/DC converters as the AC/DC converters $\mathbf{5}_1$ and $\mathbf{5}_2$ of the storage device 1 and the storage device 161 is further equipped with the same battery modules as the battery modules $\mathbf{7}_1$–$\mathbf{7}_n$ of the storage device 1 in addition to the AC/DC converters $\mathbf{5}_1$ and $\mathbf{5}_2$.

The host I/F's $\mathbf{169}_1$–$\mathbf{169}_n$ of the storage device 161 and the host I/F's $\mathbf{179}_1$–$\mathbf{179}_n$ of the storage device 163 are connected to each other by a virtual disk cable 165, and the host I/F's $\mathbf{169}_1$–$\mathbf{169}_n$ of the storage device 161 and a host (not shown) are connected to each other by a host I/F cable 167.

With the above configuration, when a power failure has occurred in the commercial power line (AC inputs $\mathbf{177}_1$ and $\mathbf{177}_2$) on the storage device 161 side (i.e., on the main storage device side), the storage device 161 performs power failure processing according to the method that was described in the embodiment of the invention with reference to FIG. 1. However, the driving of the host I/F's $\mathbf{179}_1$–$\mathbf{179}_n$ of the storage device 163 (main storage device) is not stopped even if the power failure lasts more than one minute.

If no power failure occurs in the commercial power line (AC inputs $\mathbf{187}_1$ and $\mathbf{187}_2$) on the storage device 163 side, not only the storage-device-161-side HDDs $\mathbf{175}_1$–$\mathbf{175}_n$ but also the storage-device-163-side HDDs $\mathbf{185}_1$–$\mathbf{185}_n$ can be write destinations of data that are temporarily stored in the cache memories $\mathbf{171}_1$–$\mathbf{171}_n$ of the storage device 161.

If a power failure occurs in both of the storage-device-161-side commercial power line (AC inputs $\mathbf{177}_1$ and $\mathbf{177}_2$) and the storage-device-163-side commercial power line (AC inputs $\mathbf{187}_1$ and $\mathbf{187}_2$), the storage device 161 receives no response from the storage device 163 via the virtual disk I/F cable 165. Therefore, it is necessary that part of data stored in the cache memories $\mathbf{171}_1$–$\mathbf{171}_n$ of the storage device 161 whose write destinations are the HDDs $\mathbf{175}_1$–$\mathbf{175}_n$ of the storage device 163 be also backed up in a state that they are stored in the cache memories $\mathbf{171}_1$–$\mathbf{171}_n$ of the storage device 161.

The preferred embodiment of the invention has been described above. However, it is just an example for the description of the invention and the scope of the invention is not limited to the embodiment. The invention can also be implemented in other various forms.

What is claimed is:

1. A storage device comprising:

a disk driving device for storing data that are received from an information processing apparatus;

a cache memory for temporarily retaining data to be stored in the disk driving device;

a backup power source for backing up individual units of the storage device including the disk driving device and the cache memory;

a power failure detecting unit for checking a status of power supply from a power source;

a backup power supply control unit for distributing output power of the backup power source to the individual units of the storage device including the disk driving device and the cache memory in a first period that starts after detection of a power failure by the power failure detecting unit, and for supplying the cache memory with power that has been distributed to units excluding the cache memory after a lapse of the first period;

a data accepting unit for accepting data from the information processing apparatus and writing the accepted data to the cache memory; and a data transfer unit for transferring data stored in the cache memory to the disk driving device, wherein the power failure detecting unit is provided in each of the data accepting unit and the data transfer unit, and the power failure detecting units detect a power failure by checking statuses of power supply from the power source in the data accepting unit and the data transfer unit, respectively, and communicating check results to each other.

2. The storage device according to claim 1, wherein the data accepting unit continues an operation of accepting data from the information processing apparatus and writing the accepted data to the cache memory until a lapse of a second period that starts after the detection of the power failure by the power failure detecting units and that is shorter than the first period.

3. The storage device according to claim 2, wherein the backup power supply control unit distributes the output power of the backup power source only to devices that are necessary to transfer the data from the cache memory to the disk driving device in a period from the lapse of the second period to the lapse of the first period.

4. The storage device according to claim 3, further comprising a status monitoring unit for monitoring statuses of the disk driving device and/or the cache memory, wherein the backup power supply control unit supplies the cache memory with power that has been distributed to units excluding the cache memory even before the lapse of the first period if the status monitoring unit judges on the basis of a monitoring result that writing to the disk driving device of the data transferred from the cache memory will not be completed in the period from the lapse of the second period to the lapse of the first period.

5. A storage device comprising:

a disk driving device for storing data that are received from an information processing apparatus;

a cache memory for temporarily retaining data to be stored in the disk driving device;

a backup power source for backing up individual units of the storage device including the disk driving device and the cache memory;

power failure detecting units for checking a status of power supply from a power source;

a backup power supply control unit for distributing output power of the backup power source to the individual units of the storage device including the disk driving device and the cache memory in a first period that starts after detection of a power failure by the power failure detecting unit, and for supplying the cache memory with power that has been distributed to units excluding the cache memory after a lapse of the first period;

a status monitoring unit for monitoring statuses of the disk driving device and/or the cache memory;

a dedicated power line for supplying output power of the backup power source to only the cache memory, the dedicated power line comprising a switching unit for always establishing an electrical connection between the backup power source and the cache memory;

a data accepting unit for accepting data from the information processing apparatus and writing the accepted data to the cache memory; and a data transfer unit for transferring data stored in the cache memory to the disk driving device, wherein the power failure detecting units are provided in the data accepting unit and the data transfer unit, respectively, and detect a power failure by checking statuses of power supply from the power source in the data accepting unit and the data transfer unit, respectively, and communicating check results to each other, and the data accepting unit continues an operation of accepting data from the information processing apparatus and writing the accepted data to the cache memory until a lapse of a second period that starts after the detection of the power failure by the power failure detecting units and that is shorter than the first period;

wherein the backup power supply control unit distributes the output power of the backup power source only to devices that are necessary to transfer the data from the cache memory to the disk driving device in a period from the lapse of the second period to the lapse of the first period; and wherein the backup power supply control unit supplies the cache memory with power that has been distributed to units excluding the cache memory even before the lapse of the first period if the status monitoring unit judges on the basis of a monitoring result that writing to the disk driving device of the data transferred from the cache memory will not be completed in the period from the lapse of the second period to the lapse of the first period.

* * * * *